(12) United States Patent
Loussert et al.

(10) Patent No.: US 11,431,235 B2
(45) Date of Patent: Aug. 30, 2022

(54) ACTUATOR WITH MOVING COIL FRAME AND ENHANCED DYNAMICS

(71) Applicant: MOVING MAGNET TECHNOLOGIES (MMT), Besançon (FR)

(72) Inventors: Guillaume Loussert, Besançon (FR); Stéphane Biwersi, Frambouhans (FR)

(73) Assignee: Moving Magnet Technologies (MMT), Besancon (FR)

( * ) Notice: Subject to any disclaimer, the term of this patent is extended or adjusted under 35 U.S.C. 154(b) by 645 days.

(21) Appl. No.: 16/061,958

(22) PCT Filed: Dec. 13, 2016

(86) PCT No.: PCT/FR2016/053363
§ 371 (c)(1),
(2) Date: Jun. 13, 2018

(87) PCT Pub. No.: WO2017/103424
PCT Pub. Date: Jun. 22, 2017

(65) Prior Publication Data
US 2018/0375416 A1 Dec. 27, 2018

(30) Foreign Application Priority Data

Dec. 15, 2015 (FR) ...................................... 1562353

(51) Int. Cl.
*H02K 33/18* (2006.01)
*H02K 11/21* (2016.01)

(52) U.S. Cl.
CPC ............. *H02K 33/18* (2013.01); *H02K 11/21* (2016.01)

(58) Field of Classification Search
CPC ...... H02K 33/18; H02K 11/21; H02K 21/227; H02K 21/222; H02K 21/145; H02K 21/12;
(Continued)

(56) References Cited

U.S. PATENT DOCUMENTS

| | | |
|---|---|---|
| 3,735,258 A | 5/1973 | Corcoran |
| 5,444,313 A | 8/1995 | Oudet |

(Continued)

FOREIGN PATENT DOCUMENTS

JP H06-165466 A 6/1994

*Primary Examiner* — Bryan R Perez
(74) *Attorney, Agent, or Firm* — Harness, Dickey & Pierce PLC

(57) ABSTRACT

A rotary actuator with a moving frame includes an electrical coil that moves on an angular travel about an axis of rotation A, the shape of the coil being an elliptical cylinder and the axis of winding B being orthogonal to the axis of rotation A, the coil being placed in the magnetic field of a fixed magnet. The fixed magnet surrounds the coil and includes two semicylindrical portions, the generatrices of which are orthogonal to the axis of rotation A, the first of the semicylindrical portions having a north pole directed toward the coil, orthogonally to the direction of the generatrices and being positioned outside the coil, the second having a south pole directed toward the coil, orthogonally to the direction of the generatrices and also being positioned outside the coil opposite the first portion. The actuator includes a ferromagnetic core inside the coil and an outer ferromagnetic yoke surrounding the fixed magnet, the coil moving in the air gap formed between the magnetized semicylindrical portions and the inner core.

21 Claims, 7 Drawing Sheets

(58) Field of Classification Search
CPC ........ H02K 21/16; H02K 21/10; H02K 21/24; H02K 21/14; H02K 21/044; H02K 21/22; H02K 1/27; H02K 1/2766; H02K 1/12; H02K 1/278; H02K 1/2786; H02K 1/145; H02K 1/08; H02K 1/276; H02K 1/28; H02K 1/2793
USPC .......................................................... 310/15
See application file for complete search history.

(56) References Cited

U.S. PATENT DOCUMENTS

| | | | |
|---|---|---|---|
| 6,275,319 | B1 | 8/2001 | Gadhok |
| 6,313,553 | B1 | 11/2001 | Gandel et al. |
| 7,898,122 | B2 | 3/2011 | Andrieux et al. |
| 2011/0175462 | A1 | 7/2011 | Boletis et al. |
| 2012/0013275 | A1 | 1/2012 | Angelis et al. |
| 2014/0029282 | A1 | 1/2014 | Ravier et al. |
| 2014/0186194 | A1 | 7/2014 | Dainez et al. |
| 2014/0354381 | A1* | 12/2014 | Kohlhafer ............... H01F 7/081 335/179 |
| 2017/0324284 | A1* | 11/2017 | Andrieux ............... H02K 3/325 |
| 2019/0312497 | A1* | 10/2019 | Walsh ..................... H02K 11/21 |
| 2019/0319510 | A1* | 10/2019 | Smithanik ............... H02K 1/22 |

* cited by examiner

ACTUATOR WITH MOVING COIL FRAME AND ENHANCED DYNAMICS

CROSS-REFERENCE TO RELATED APPLICATIONS

This application is a National Phase Entry of International Patent Application No. PCT/FR2016/053363, filed on Dec. 13, 2016, which claims priority to French Patent Application Serial No. 15/62353, filed on Dec. 15, 2015, both of which are incorporated by reference herein.

TECHNICAL FIELD

This invention relates to an actuator with a moving coiled frame which has mechanical and electrical properties giving it a great ability to change its speed of movement. This very high dynamics, characterized by significant acceleration and deceleration capabilities, makes it possible to control with high precision a mobile member oscillating over a determined angular stroke with a velocity profile exhibiting highly variable accelerations on the stroke. In particular, such an actuator can be used to carry out an adaptive lighting system enabling a customizable lighting mode, with intensity variations on the illuminated area.

One of the preferred but non-exhaustive applications relates to lighting for a motor vehicle equipped with a laser source 59 that produces a beamreflecting on a mirror 61 and designed to illuminate the road. The dynamic qualities of an actuator according to the invention will make the lighting very flexible, for example by avoiding certain areas of the roadway or by allowing more intense illumination on other areas, or on the contrary, dim the light intensity, in order, for example, to avoid dazzling a driver coming in the opposite direction.

BACKGROUND

The type of actuators called "galvanometers", with reference to their original use in current detecting devices, are already well known and they take different forms. They may have a mobile iron, moving magnet or moving coil core. They are advantageously used in applications of dynamic oscillators typically operating at several tens or hundreds of Hertz.

These galvanometers are thus integral with an outer member to be moved on a linear or most often angular stroke generally from several degrees to several tens of degrees. A typical example is the displacement of a mirror when considering the application of light beam deflection. The movement is then periodic following a primary frequency and the mobile part oscillates within a given stroke.

When these galvanometers have a movable iron core, they have the advantage of a facilitated heat dissipation, the electrical coil being arranged on the stator and can be generously sized, enabling them to move high loads without critical heating. However, they have high inertia and inductance prohibiting their use for high frequencies, typically remaining under 50 Hz of operation.

When they have a moving magnet, they always have relatively large moving inertia and, although they have lower inductance than the movable iron actuators, their use cannot be envisaged for movements at frequencies typically higher than 100 Hz. In the example presented in U.S. Pat. No. 6,275,319, which proposes a galvanometer for a laser scanner, the operating frequency is up to about one hundred Hertz. The actuator further comprises an elastic down-pull element with a non-linear response. This non-linearity enables the actuator to be assisted in acceleration and deceleration and to limit the disturbing parasitic resonances of the structure, parasitic resonances caused, amongst others, by the excessive inertia of the magnet mobile.

When they have a moving coil, they are always made of an electrical conductor coil (copper, aluminium or silver-type) in the form of one or more rounds wound on a mechanical support or self-supported if the coil thus constituted is resinated, for example. Their advantage lies in the low inertia and inductance that can be achieved with these layouts. The disadvantage may be the low heat dissipation imposed by the low volumes of electrical conductors formed and the fact that these coils are, in most cases, mainly in contact with the air in which they move, without any contact with a thermal conductor.

The low inertia and inductance of mobile frame solutions allow them to be used in applications where the operating frequency is higher (typically several tens to hundreds of Hertz). The operation of the actuators of the prior art being generally at fixed operating frequency, it is known and advantageous to use these actuators in conjunction with an elastic return element that has a mechanical stiffness which sets a certain mechanical resonance frequency depending on this stiffness and mass or inertia in motion.

There are thus documents that have such devices, such as for example U.S. Pat. No. 3,735,258, that have a light beam deflector using a galvanometric-type mobile frame. The proposed solution operates using a torsion spring and seeks to optimize a single operating frequency by equalizing the mechanical and electromechanical resonance frequencies involving the inertia, the inductance and the mechanical stiffness of the spring.

The disadvantage of this structure lies in the choice of using a relatively long mobile frame with a rectangular shape, that has to serve both as a motor frame immersed in the magnetic field provided by fixed magnets and as the mechanical strength of the reflector used in deflecting a light beam. This solution involves relatively high inertia and electrical resistance but also a significant inductance. It also requires the construction of an aluminium ribbon coil in order to obtain improved rigidity. The result is an inefficient actuator, subject to parasitic resonance frequencies, presumably expensive to produce (from the unconventional aluminium tapes used) and difficult to build and tuned frequency. In addition, the electrical cut-off frequency of the RL system thus constituted (combination of a resistor R in series with an inductance L) can be evaluated at 2.2 Hz, a very low value which makes the system only usable effectively around the electromechanical resonance frequency (resonance between inductance and inertia).

The EP2686554 document is also known in the general field of oscillating actuators for optimizing the dynamic operation of a compressor. In this document, there is a clever proposal to use both the mechanical and electromechanical resonance frequencies of the system to overcome a problem of electrical point load of the system. In this respect, both frequencies are close enough to respect the efficiency of the compressor. This device is perfectly dedicated to the use of a vibrating actuator when used at a frequency fixed by the mechanical resonance (or which deviates from 1 or 2 Hertz of this fixed frequency) away from this reduced range and under the use of a purely sinusoidal power supply. The solution is therefore not dedicated to the use of a system to work at various frequencies and/or with significant harmonic content.

Also known is the Japanese patent application JP6-165466 describing a movable frame for moving a mirror, consisting of a cylindrical coil, positioned between two magnetic parts whose generators are parallel to the rotation axis of the coil. Such an embodiment leads to high inertia thereby limiting the dynamic movement of the moving frame. It also leads to high resistance and inductance.

Prior art devices are intended to solve the general problem of the efficiency of frequency operations. In these systems, the scanning speed is primarily performed at a fixed frequency and particularly according to a movement, within this frequency, which has a single repeated profile. The operating frequency is therefore primarily adjusted by the system resonance frequencies. These devices of the prior art are used to work around this fixed frequency with a low harmonic content.

Now, in systems where the scanning speeds must be variable, as shown for example in document EP2690352, these prior art actuators cannot provide a satisfactory answer because they do not have, by their resonant nature, the ability to change their operating frequency without greatly impacting the efficiency of the actuator. In addition, if we take for example the highly dynamic scanning application of laser-type automotive lighting (typical frequency of 200 Hz), there is a need, within the imposed movement at a scanning frequency fixed, to obtain a great acceleration variability with the possibility of slowing or accelerating the beam in different places on the angular stroke of the actuator. The devices of the prior art thus have speed characteristics strongly influenced by the mechanical stiffness printed by the torsion springs, with parabolic profiles depending on time, making it difficult to modify this speed profile within the primary frequency of use.

SUMMARY

This invention aims at overcoming the disadvantages of the state of the art by proposing an actuator with optimized geometric and physical properties, that minimizes the significance of the mechanical resonance frequency, the mechanical resonance frequency $f_{rm}$ being defined by the value $$f_{rm} = \frac{1}{2\pi}\sqrt{\frac{K}{J}},$$

where K is the mechanical stiffness (in Nm/rad) and J is the mobile moment of inertia (in kg·m²), by obtaining an electrical cutoff frequency and an electromechanical resonance frequency much greater than the primary frequency periodic signal supplying the actuator, where the cut-off frequency $f_{ce}$ of the electrical system is defined by $$f_{ce} = \frac{1}{2\pi}\frac{R}{L}$$

with R the electrical resistance (in Ohm) and L the inductance (in H) and the electromechanical frequency $f_{em}$ of the actuator is defined by $$f_{em} = \frac{1}{2\pi}\sqrt{\frac{K + \frac{Kt^2}{L}}{J}},$$

where Kt is the coupling constant in the actuator (in Nm/A).

By these characteristics, another item of the invention is to enable the power supply of the actuator with a primary frequency periodic signal whose harmonic content is rich (typically with a 5-point Harmonic pattern that has an amplitude higher than 10% of the amplitude of the modulating signal). In order to enable these functionalities, this invention thus proposes a movable frame actuator with an elliptical shape, preferably circular, which makes it possible to obtain a very low inertia, generally adjusted to a value up to that of the inertia of the outer member to be moved, as well as optimized force, inductance, and resistance characteristics to repel fce and fem well beyond the primary frequency periodic signal.

More particularly, in order to meet these objectives, the invention refers to a rotary actuator with a moving frame consisting of an electrical coil that moves on an angular travel about a rotation axis A, the shape of the coil being an elliptical cylinder and the coiling axis B being orthogonal to the rotation axis A, the coil being placed in the magnetic field of a fixed magnet, according to the invention the fixed magnet surrounds said coil and consists of two semi-cylindrical portions, the generators of which are orthogonal to the rotation axis A, the first of the semi-cylindrical portions having a North pole N directed toward the coil, orthogonally to the direction of the generators and being positioned outside the coil, the second having a south pole S directed toward the coil, orthogonally to the direction of the generators and also being positioned outside the coil opposite the first portion, the actuator including a ferromagnetic core inside the coil and an outer ferromagnetic yoke surrounding the fixed magnet, the coil moving in the air gap AG formed between the magnetized semi-cylindrical portions and the inner core (6).

Preferably, the coil is attached to a mechanical shaft guided by means of the outer yoke. One of the items of the invention is to enable operation even without any elastic return element. In order to enable operation in a closed loop, the system may further comprise an electronic control circuit ECC supplying the coil with a signal 21 that has a primary frequency of use greater than 100 Hz, as best shown in FIG. 8.

Within the context of a light deflection application, the mechanical shaft supports an element with a reflective surface placed in the direct vicinity of the rotation axis. In usage cases where major variations in speed are desired, the electronic command circuit supplies the coil with a primary frequency periodic signal with a harmonic content having a more than 5-point Harmonic pattern whose amplitude is higher than 10% of the primary frequency amplitude. For a closed control loop, the actuator comprises an angular position sensor MS to detect the position of the sensor conveying an electric control circuit signal towards the supply voltage of the coil depending on the reference profile of the speed according to the position.

Preferably, the coil has a circular elliptical longitudinal section but it can also be designed in an elliptical non-circular form. In the preferred mode, the mechanical shaft crosses the ferromagnetic core, without contact or guidance with the core although it could be envisaged that the mechanical shaft is guided at the level of the ferromagnetic core, without contact or guidance with the ferromagnetic yoke. In one particular form of embodiment, the mechanical shaft has a sensor magnet positioned near a magnet sensitive probe and interacting with the probe to detect the position of the sensor magnet.

During the use of the sensor magnet, the actuator is controlled by a primary frequency periodic signal and has a mechanical resonance frequency less than or equal to the primary frequency, in magnetic interaction with the sensor magnet. To minimize inductance in the coil, the core and the outer yoke can be made of a stack of ferromagnetic sheets. The invention also concerns the command procedure of the actuator for an adaptive lighting system comprising an actuator as defined, characterized in that the supply voltage of the coil is modified periodically depending on a position signal emitted by the angular position sensor MS of the said coil and having a position-dependent speed profile.

BRIEF DESCRIPTION OF THE DRAWINGS

Other characteristics and advantages of the invention will be seen in the following detailed examples of embodiment, with reference to the figures in annexure which represent the following items respectively.

DETAILED DESCRIPTION

Figure 1A:
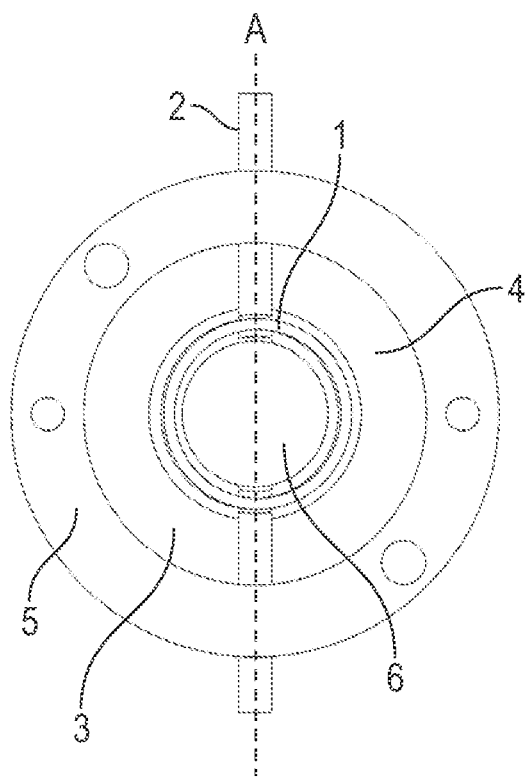
FIGS. 1 a and 1 b, respectively show the front and perspective views of an actuator in line with the invention.
Figure 1B:
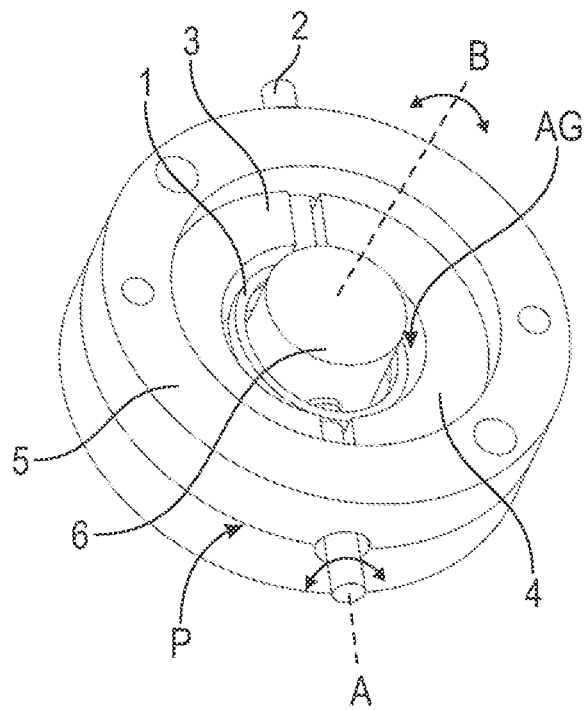

FIGS. 1 a and 1 b show an actuator made in line with the invention. It comprises a mobile electrical coil (1) rotating on an axis (A) and is made up of electrical conductor spires. The coil (1) is an elliptical cylinder, here in the preferred circular form, and the coiling axis B of the spires is orthogonal to the axis of rotation (A). Because of the rotation of the coil on the axis (A), the coiling axis (B) is oriented such that it moves but always remains orthogonal to the rotation axis (A).

Figure 10:
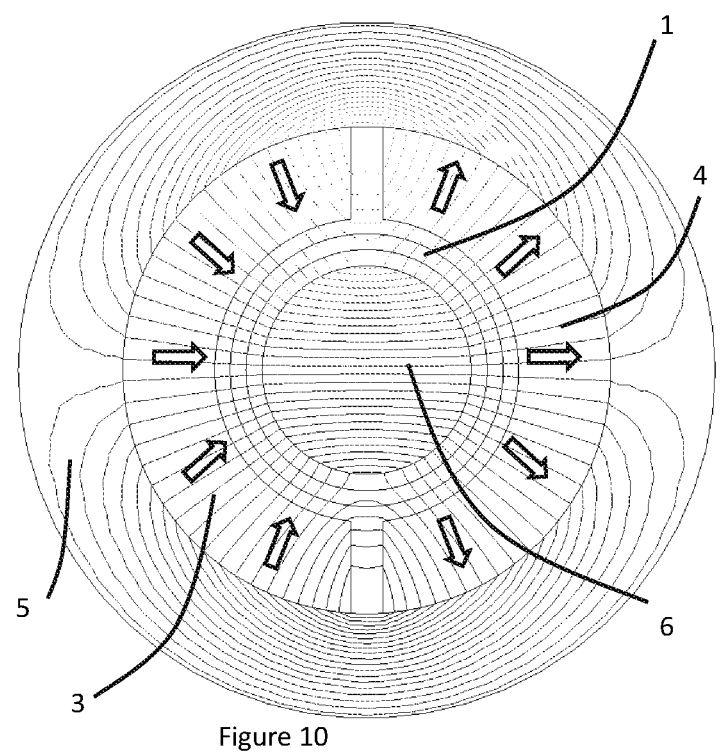
FIG. 10 shows a front view of an actuator made following the invention superposed with field lines following the first form of embodiment of magnetization.
Figure 11:
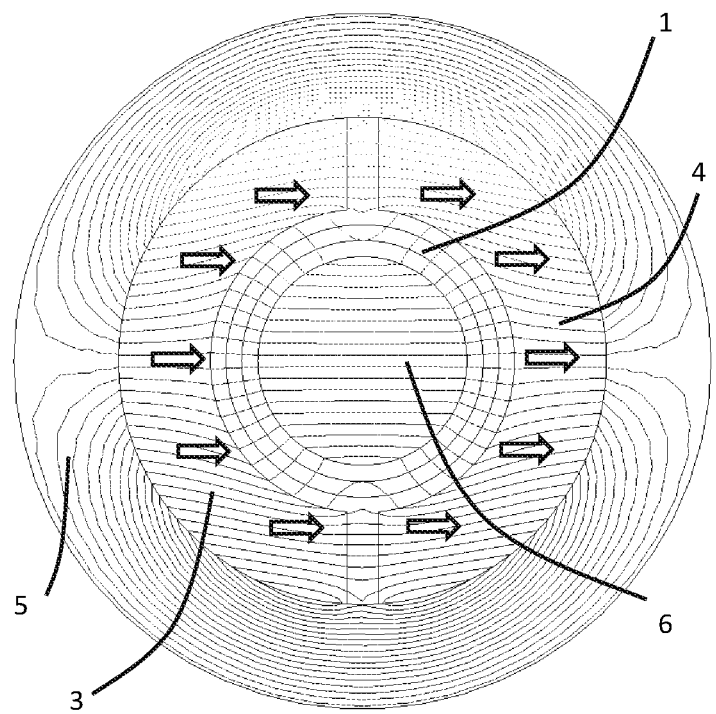
FIG. 11 shows a front view of an actuator made according to the invention superposed with field lines following the second form of embodiment of magnetization.

The coil (1) is attached to a mechanical shaft (2) which serves to carry the coil but also serves to move an external organ (external organ not shown here). As it rotates, the coil (1) is mobile relative to two semi-cylindrical permanent magnets (3, 4) whose generators (not shown here) are always orthogonal to the axis of rotation A. These permanent magnets (3, 4) are magnetized such that the direction(s) is or are orthogonal to the tubular magnet generators such that the magnetic field created by the magnets (3, 4) will be mostly oriented in a series of planes that are parallel to the plane defined by the rotation axis A and an axis perpendicular to the magnetized semi-cylindrical parts, as shown in FIGS. 10 and 11.

Figure 2:
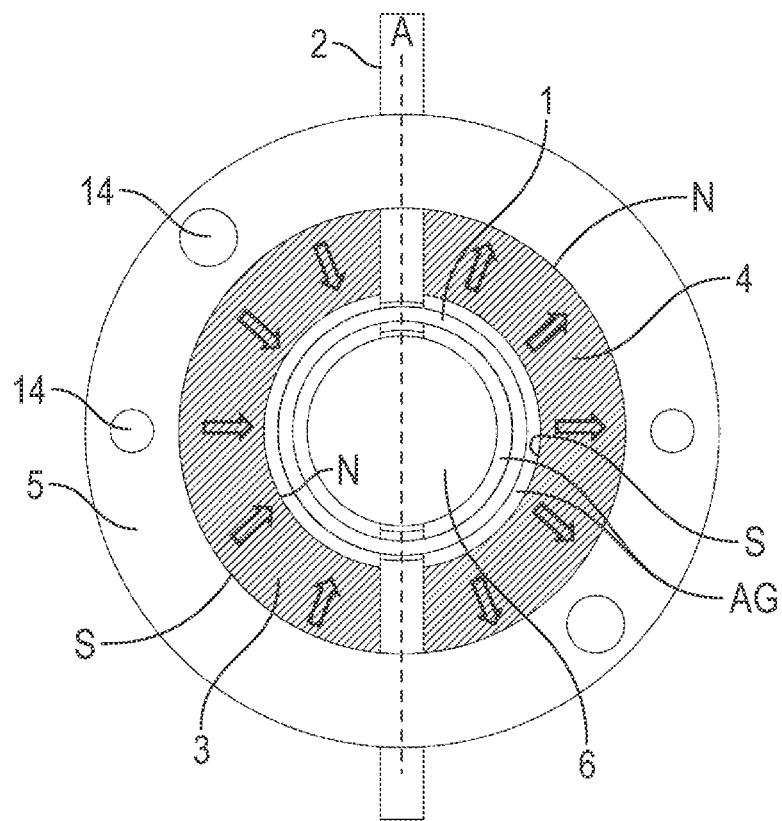
FIG. 2 shows a front view of the actuator following a first form of embodiment of the magnetizing.
Figure 3:
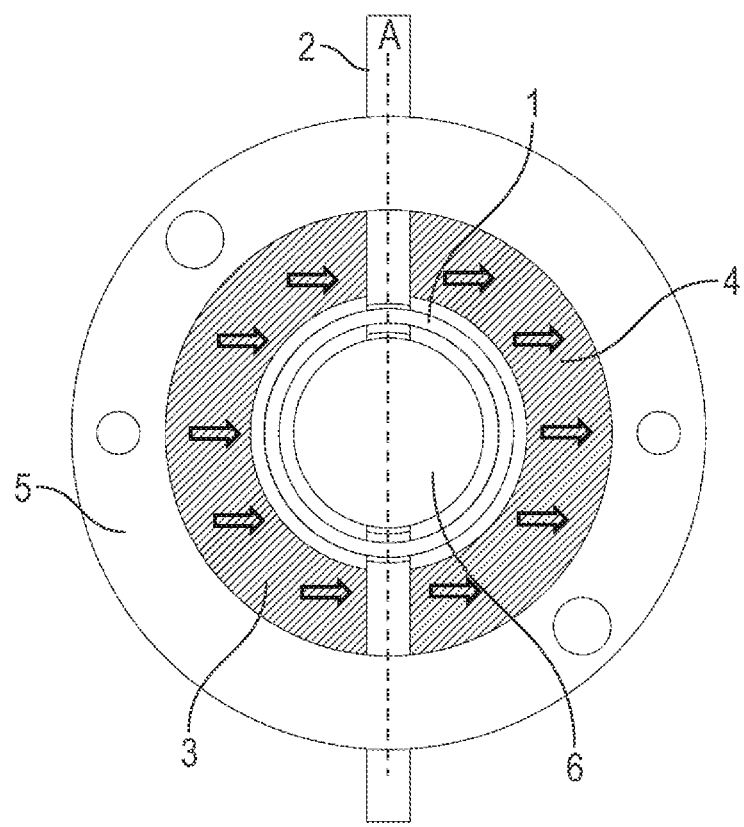
FIG. 3 shows a front view of the actuator following a second form of embodiment of the magnetization.

The magnetization of the magnets (3, 4) is such that one of the magnets (3) must have its North pole N oriented towards the air-gap AG and the coil (1), and the other magnet (4) must have its North pole N oriented in the opposite direction to the air-gap AG and the coil (1), with no importance in the positioning of the magnets (3, 4) to the left or right of the coil (1). As shown in FIG. 2, the magnetization of the magnetic parts (3, 4), represented by the large gutted arrows on the magnets (3, 4), can be radial in relation to the circular cylindrical form of the magnetized parts (3, 4) or, as shown in FIG. 3, diametrical, in relation to the circular cylindrical shape of the magnetized parts (3, 4). An advantage of the radial magnetization shown in FIG. 2 is that it helps obtain better performances from the actuator while enabling an optimum torque constant in the actuator and a more radial direction of the field in the air-gap AG as can be inferred from FIGS. 10 and 11, view of field lines of cases presented respectively in FIGS. 2 and 3.

The bores (14) which can be seen in FIG. 2 especially, serve as indexing and fixation items and are entirely optional, since they have no influence on the performances of the actuator in question in this invention.

Figure 13:
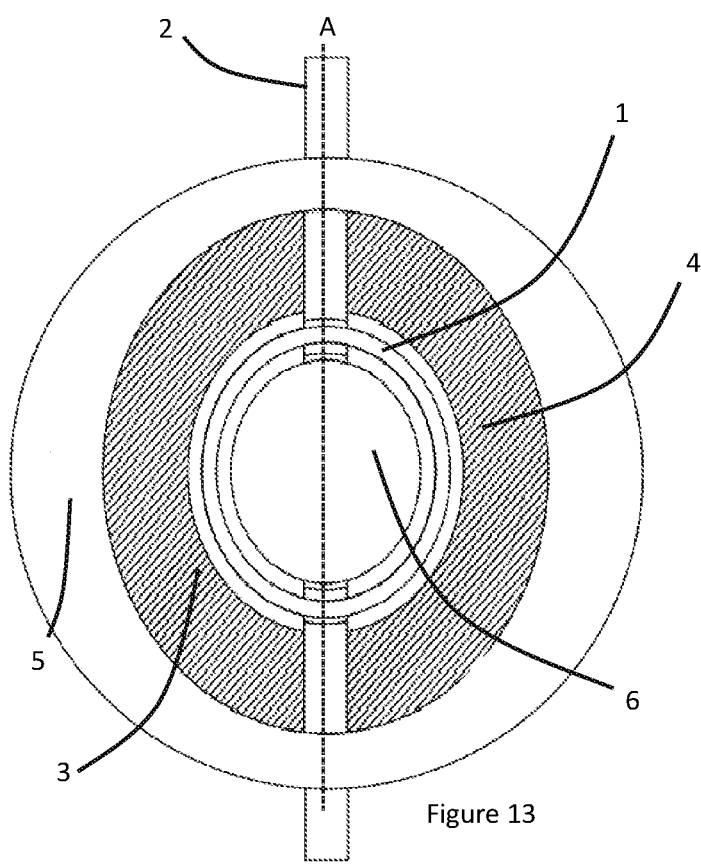
FIG. 13 shows a front view of the actuator in line with the invention following an alternative form of embodiment of the coil, a longitudinal section in the elliptical non-circular form.

These magnets (3, 4) are placed externally, on either side of the coil (1). These magnets (3, 4) are fixed to an outer yoke (5) made of soft ferromagnetic material surrounding the magnets (3, 4) in order to enable magnetic flow between the magnets (3, 4) and maximize induction inside the air-gap AG. Internally in the cylindrical coil (1) is an internal core (6), which is fixed relative to the coil (1), and also realized in soft ferromagnetic material in order to channel the magnetic field produced by the magnets (3, 4). The coil (1) is thus positioned in an air-gap AG formed between the magnet (3) and the internal core (6) on one side for part of the coil (1) and in an air-gap AG formed between the magnet (4) and the internal core (6) on the other side of the core (1). All components of the fixed part: magnets (3, 4), internal core (6) and outer yoke (5) are, in this example, circular and this enables optimization of the form and volume of the components. Of course, it is possible to envisage a parallelepipedic, non-circular outer yoke, for example, without modifying the functioning or performances of the actuator. The generally circular shape of the coil is optimal however, as it enables the maximum performance of the actuator. A generally elliptical shape can be envisaged for the actuator (1) to adapt the structure for a specific use, as shown in FIG. 13 for illustrative purposes.

The functioning of the actuator, in line with the well-known Laplace Law, is as follows: when current flows through the coil (1), the conductor, being found in the magnetic field of the two air-gaps defined above, is subjected to a force which tends to create a couple round the rotation axis (A). By altering the direction of electricity flow in the coil (1), it is thus possible to apply a positive or negative coupling and to cause the coil (1) to oscillate round the rotation axis (A). The coiling axis (B) is consequently oriented in relation to the rotation axis (A). The coil (1) is completely immersed in the air-gaps created, such that, when the oscillation of the coil reaches a few degrees (typically up to about twenty or thirty degrees), the coupling constant obtained is almost constant along the stroke, thus easing the control of the actuator by controlling the intensity of the electricity flow.

No mechanical or magnetic spring exists in the actuator, such that the coil (1) is totally free and is moved by the magnetic torque created by the electricity flow. It may thus be important to produce mechanical stops to prevent the coil (1) from entering into contact with the internal core (6) during rotation.

The fact that there is no mechanical or magnetic spring makes the control of the position of the coil (1) easier. Similarly, the dynamics of very flexible movement is eased by the elliptical cylindrical shapes, and in this particular case, the circular shape of the coil (1) and magnets (3, 4) which help reduce inductance and inertia in the coil (1) while maintaining a constantly strong coupling. These inductance and inertia factors, as well as the constancy of the coupling, are highly improved as compared to prior art layouts. The electromagnetic resonance frequency of the actuator is thus relatively high and pushed well above the primary operating frequency (typical orders of magnitude: 200 Hz for the primary operating frequency 1 kHz to 1.5 kHz for the electromechanical frequency). This sharp difference helps envisage a harmonics rich command signal (typically a Harmonic of 5 with an amplitude typically above 10% of the primary amplitude frequency), thus enabling generation of highly variable speed profiles depending on the terms of reference stipulated. The electricity cut-off frequency of the system is also pushed beyond the main operating frequency (typical order of magnitude above 10 kHz), because of the relationship between resistance and inductance.

Figure 12:
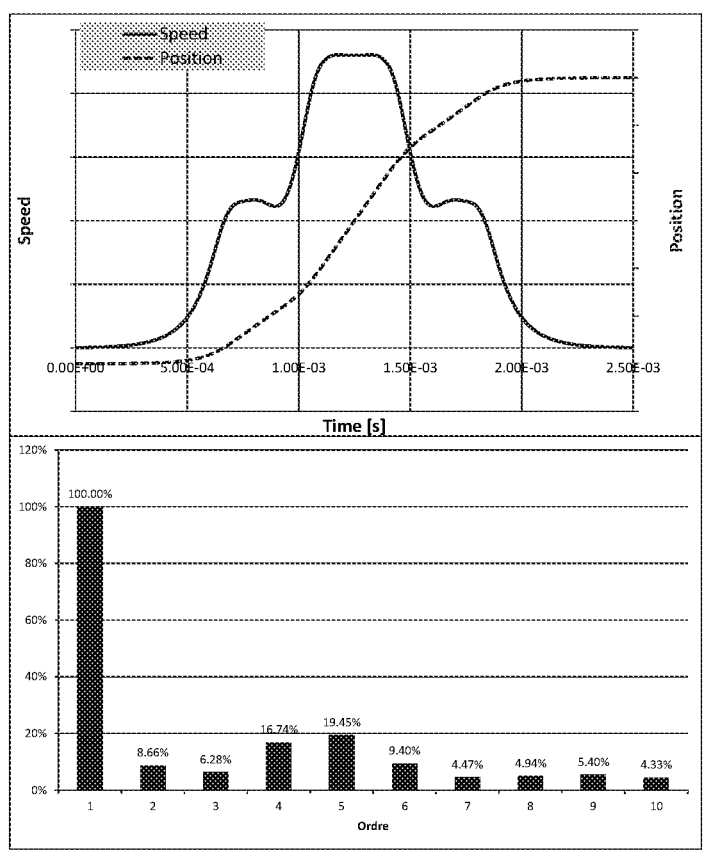
FIG. 12, shows, for illustration purposes, the possible speeds and positions with the actuator in line with the invention, as well as the harmonic breakdown of the speed.

The typical performances likely to be obtained with an actuator made following the invention are illustrated in FIG. 12, as examples. As can be appreciated, speed profiles and position depending on very different times can be possible with such an actuator. These highly variable profiles can be appreciated more specifically upon consideration of the harmonic breakdown realized. Among other things, it can be observed that the Harmonic is relatively higher relative to the amplitude of the primary frequency signal (here, the primary Harmonic is at 200 Hz) with high amplitude harmonics (>10%) up to order 6 typically, although this content is non-exhaustive in any way.

Figures 4A, 4B:
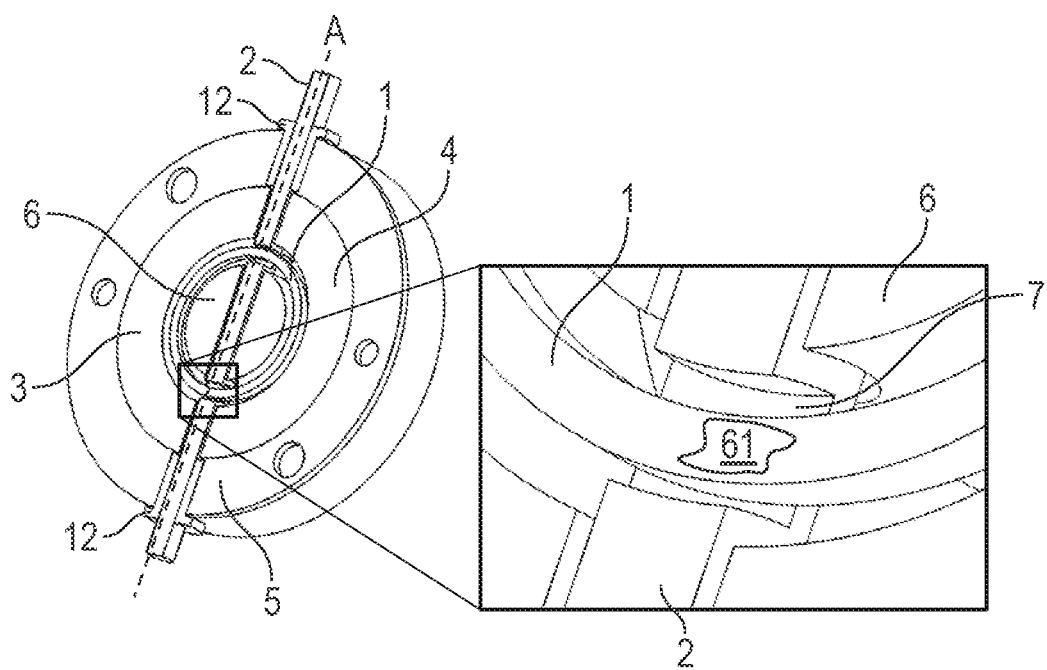
FIGS. 4 a and 4 b respectively show a cross sectional perspective view following plane P and magnification of the said perspective of the actuator in line with the invention.

FIG. 4a shows a perspective view of the cross section following the median plane P as visible in FIG. 1 b. It helps among other things, to view the guiding components (12), such as bearings, which help to guide the mechanical shaft (2) during rotation. A non-exhaustive advantage is that the mechanical shaft (2) is made from a rigid material (metal, carbon fibre, etc.) thus enabling conservation of a relatively low diameter as a way of minimizing inertia during movement while maintaining enough rigidity to prevent the actuator from showing any deformities orthogonally to the rotation axis (A) during rotation, thereby limiting interference frequencies during operation. The mechanical shaft (2) shall however preferably be made in non-magnetic material. The guiding elements (12) are advantageous in being made from a material that limits the friction coefficient with the rotation axis, such as a PTFE material or a thermoplastic polymer with a low friction coefficient. In order to prevent any harmful static indeterminacy, it is preferable for the mechanical shaft (2) not to have any guiding at the level of the core (6), since the shaft (2) diameter is less than the diameter of the passage at the level of the core (6).

The enlarged FIG. 4b helps appreciate the attachment of the coil (1) to the mechanical shaft (2). An interesting possibility is the creation of flats (7) on the shaft (2) such that a flat reception area is created for attaching the coil (1). The coil shall preferably be placed close to the rotation axis (A) so as to p the mobile center of inertia close to this axis (A) and by so doing, limit sensitivity to external vibrations transmitted by the actuator. This positioning shall also preferably guarantee a constant optimum couple in the actuator.

The coil shall advantageously be coiled and steeped in a thermosetting resin 61 (epoxy for example), thus giving the coil a rigidity while guaranteeing its lightness and minimizing its moment of inertia. Thus coated in resin and made rigid, the coil can be placed (glued for example) on the mechanical shaft (2) at the level of the flats (7). In this light, a metallic shaft is preferable.

One of the advantages of mechanical connection of the coil (1) and the shaft (2) also results from the thermal dissipation enabled by the contact between the coil (1) and the shaft (2) at the level of the flats (7). In fact, this contact, even if limited, helps evacuate the heat produced by the Joule effect of the coil (1) in the shaft (2) and thus enables better thermal resistance (lower) if compared to the thermal resistance of this coil (1) in the air, without physical contact with the shaft (2).

A preferred application of an actuator according to the invention is in the deviation of light beams 60, lasers for example, through the displacement of a mirror reflecting the said beam 60. To this effect, a mirror (11) can thus be connected to the mechanical shaft (2) and to the extremities of the axes, with the precise control of the movement of the coil enabling precise displacement of the mirror (11). A position sensor can be envisaged on the other end of the mechanical shaft (2), to enable determination of the position of the mechanical shaft (2) and therefore that of the coil (1). Knowing the position of the shaft enables adjustment of the current in the coil in order to respect a positioning or speed guideline through the use of a closed circuit electronic command device.

Figure 5:
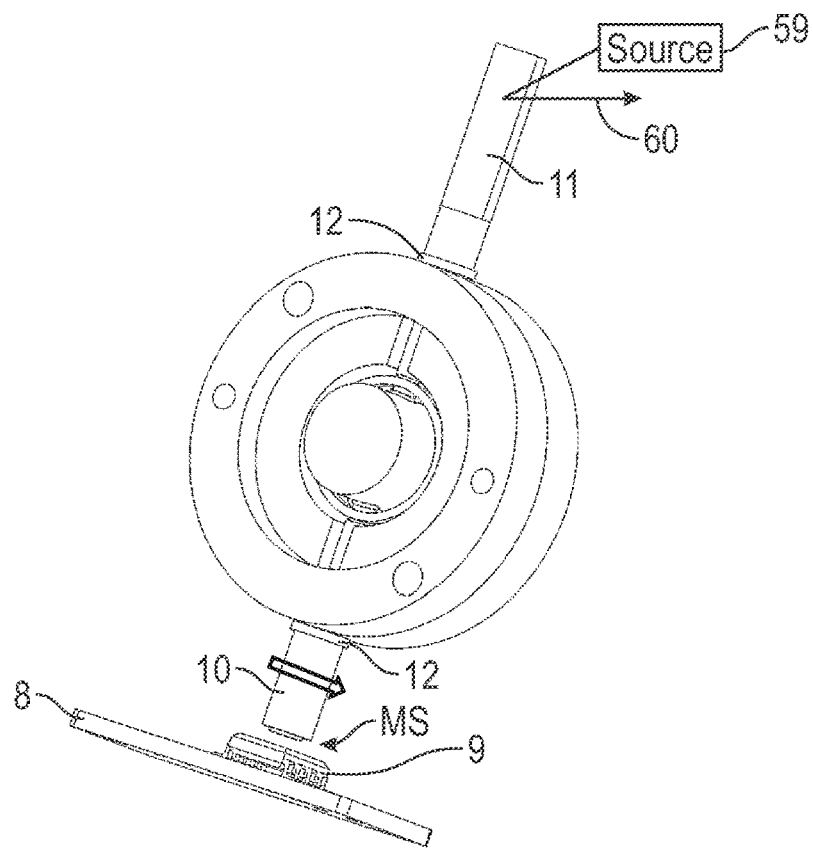
FIG. 5 shows a perspective view of the actuator and position sensor used to move and detect the position of the mirror.

In the FIG. 5 example, the position sensor is a magnetic sensor MS constituted by a sensor magnet (10) whose magnetization is done following the large gutted arrow, that is, orthogonally to the rotation axis (A). This sensor magnet (10) interacts with a magnetism sensitive probe (9), placed on a circuit board (8), which detects the variation in the direction of the magnetic field. A commercial example of this type of sensor is the Triaxis® sensor produced by Melexis. The advantage of this type of sensor is its precision and ease of assembly and the channeling of the magnetic flow generated by the magnets (3, 4) of the actuator by the outer yoke (5) cancels out any perturbation on the magnet sensitive probe (9).

The use of a sensor magnet (10) can, however, add a magnetic couple to the actuator, through the magnetic interaction between the sensor magnet and the actuator, which thus introduces a mechanical resonance frequency. It is thus advisable to configure the distance between the sensor magnet (10) and the frame (5) such that the resonance frequency is typically less than or equal to the primary supply frequency of the coil (1). It is also possible to opt for a bipolar supply of the magnet (10) following the axis (A), thus enabling minimization of the magnetic coupling between the sensor and the actuator.

Figure 6A:
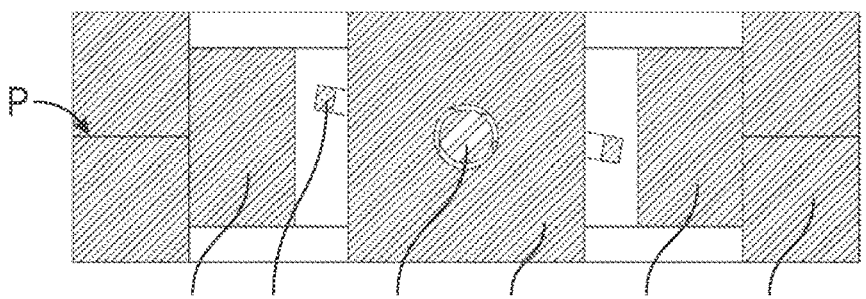
FIGS. 6 a and 6 b show transverse cross-sectional views of the rotation axis (A) with the coil in the two extremities of its stroke.
Figure 6B:
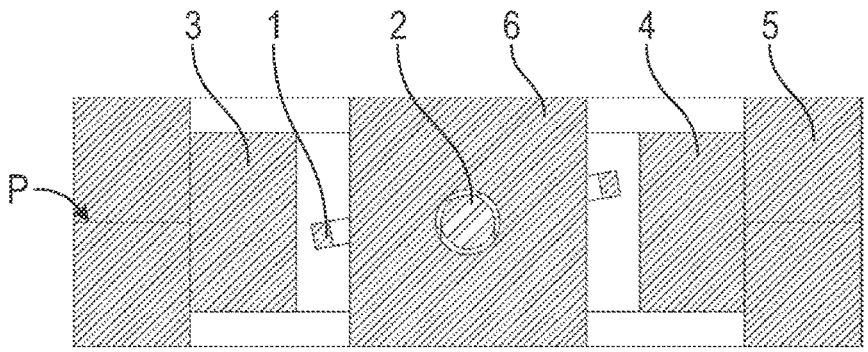

In FIGS. 6a and 6b, following a transverse cross section of the rotation axis (A), the extreme positions that the shaft (1) can take during operation are shown. These positions can be much further apart but this depends on the desired stroke. In the example, the angular deviation is 20°, that is, +/10° round the position of the coil (1) and is centred in the stroke. It should be noted that plane P of the longitudinal section of the actuator can be a construction section of the actuator so that it can have a two-piece outer yoke (5) and facilitate the construction of the actuator.

The fact of the actuator not having an elastic return element, or an external elastic element, to add a low stiffness, enables oscillating operation of the actuator to be envisaged not only round the centred position but also with a displacement. For example, it can oscillate round one or two positions that can be seen in FIGS. 6a and 6b or any other oscillation in within the extreme positions. In the views shown in FIGS. 6a and 6b, it can also be seen that the transverse height of the core (6) and the outer yoke (5) shall advantageously be higher to the transverse height of the magnets (3, 4) this in order to reduce the magnetic induction in the ferromagnetic parts and optimize performances while preventing magnetic saturation.

Figure 7:
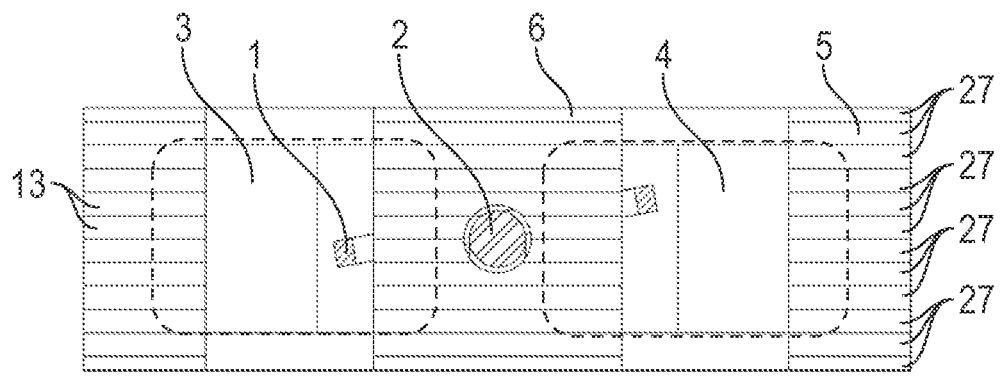
FIG. 7 shows a transverse cross-sectional view of the rotation axis (A) where the fixed ferromagnetic components are produced out of a lamination stack.

Because of the relatively low inductance of the coil and the absence of movement of the magnets relative to the frame (5, 13), a ferromagnetic core (6), losses due to magnetic hysteresis or induced current, generally known as iron losses, are negligible. However, thanks to the purely cylindrical nature of the magnetic structures, and the circulation of the magnetic flow, it is possible to envisage the creation of the core (6) and the frame (5) in the form of sheets 27, for example in iron-silicon sheets. This enables a possible advantage in the embodiment and cost of the structure. It also helps reduce the inductance of the coil (1), the magnetic flows produced by the coil when it crosses the sheets 27, following a direction not preferred for the sheets 27 (across the sheets), the flow in the coil (1) is reduced in this location without penalizing the flow produced by the magnets (3, 4) which circulate in a generally orthogonal direction (following the orientation of the coil (1)) to that of the coil (1), the circulation of the flow of the coil can be appreciated with the help of the spotted traces visible in FIG. 7.

Figure 8:
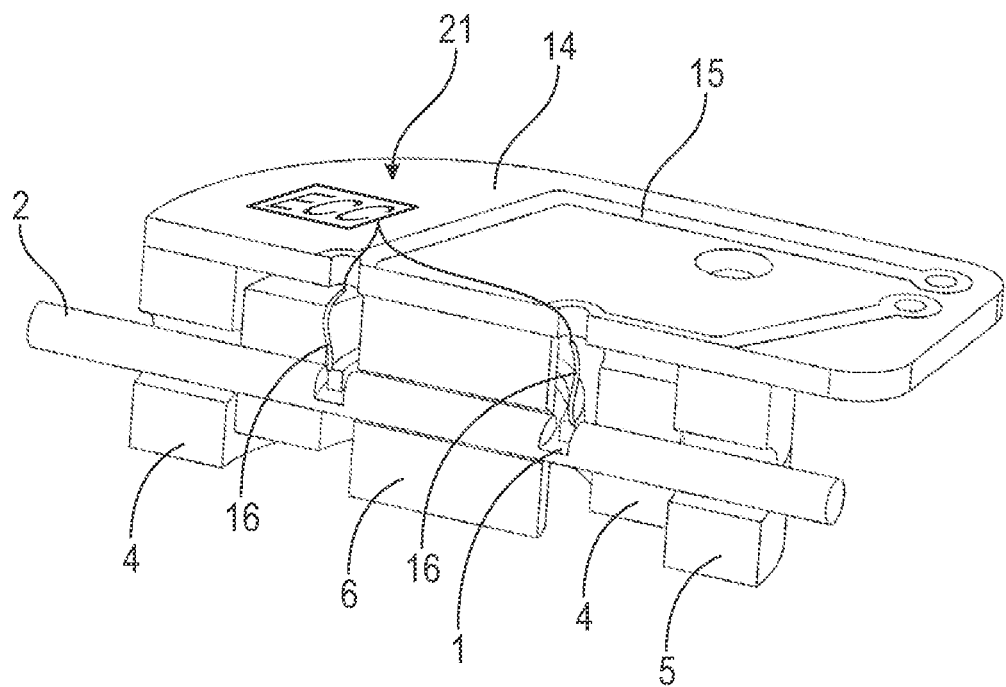
FIG. 8 shows a longitudinal sectional view along the rotation axis (A), of the actuator following the first form of embodiment.

One of the important challenges to meet for the actuator is to achieve an efficient and durable connection of the coil (1). In fact, with the coil being mobile, its supply should preferably be done using mobile wires. In FIG. 8, we show an example of electric connection of these mobile wires (16) to a circuit board (14). Preferably, these mobile wires (16) should be connected to a circuit board (14) as close as possible to the rotation axis (A) to limit their angular excursion and their displacement and they can as well be extended in front (as shown in FIG. 8) or behind (not shown) the actuator. The mobile wires (16) are thus welded to the circuit board (14), and then the supply can be moved using conductive copper tracts (15) belonging to the printed circuit (14).

Figure 9:
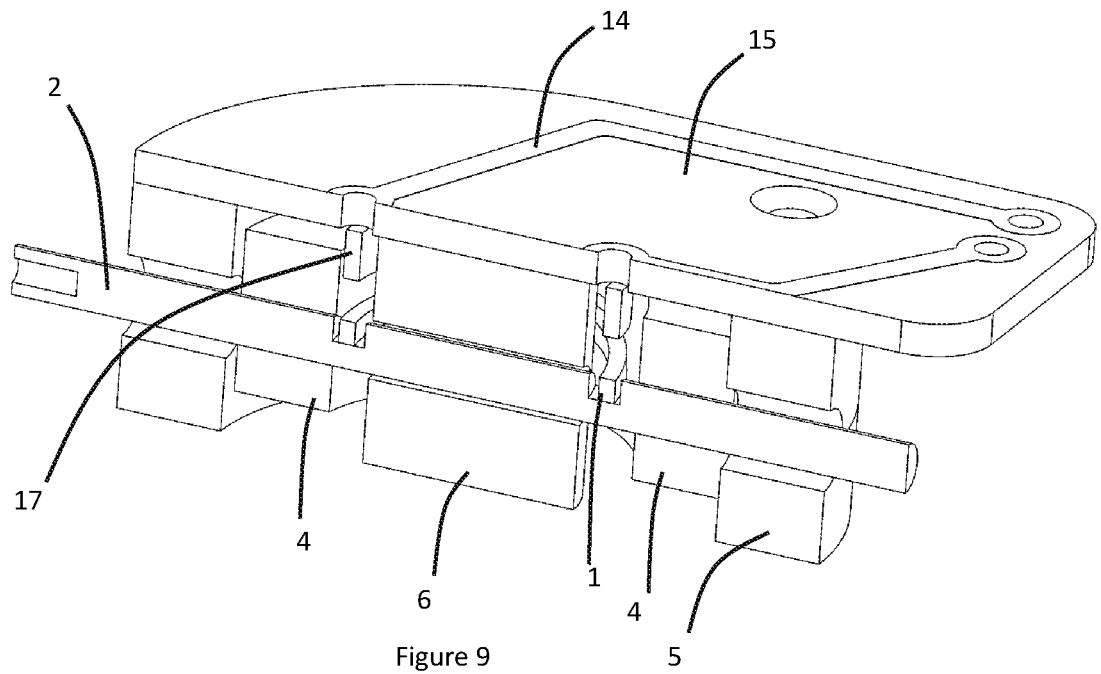
FIG. 9, a longitudinal cross-sectional view along the rotation axis (A), of the actuator following a second form of embodiment of electricity supply to the coil.

Another interesting alternative for the electrical supply of the coil (1) is to provide contact free supply through a primary coil (17) attached to the circuit board (14) as shown in FIG. 9. The actuator coil (1) can thus be short-circuited to prevent any movement in the exit wires. The supply of the actuator coil (1) is thus realized by supplying the primary coil (17) and applying Lenz's law, similarly to a transformer.

This solution implies a consumption of higher amounts of electrical energy, because of losses caused by the Joule effect in the two coils (1, 17) and the imperfect coupling between the two coils (1, 17) but eventually helps guarantee greater durability in the actuator connections.

The invention claimed is:

1. A moving frame rotary actuator comprising; a ferromagnetic inner core a cylindrical ferromagnetic outer yoke; a pair of semi-cylindrical fixed magnets fixed within the yoke; a shaft rotatable relative to and intersecting the yoke twice, said shaft rotatable relative to the inner core, the yoke and the magnets around a rotation axis A: an elliptical cylinder electrical coil comprising a coiling axis and fixedly coupled to the shaft, said shaft and said elliptical cylinder electrical coil moving around the rotation axis A, the coiling axis B being orthogonal to the rotation axis A, the coil being disposed in a magnetic field of the pair of semi-cylindrical fixed magnets within an annular air gap between the semi-cylindrical fixed magnets and the inner core, a first of the pair of semi-cylindrical fixed magnets having a north pole directed toward the elliptical cylinder electrical coil, a second of the pair of semi-cylindrical fixed magnets having a north pole directed away.

2. The actuator according to claim 1 wherein the elliptical cylinder electrical coil is integral with a mechanical shaft guided by the outer yoke.

3. The actuator according to claim 1 wherein the actuator comprises no elastic return element.

4. The actuator according to claim 1 further comprising an electronic control circuit supplying the elliptical cylinder electrical coil with a signal that has a primary frequency of use greater than 100 Hz.

5. The actuator according to claim 4 wherein the electronic control circuit supplies the coil with a primary frequency periodic signal that has a harmonic content with at least one harmonic pattern greater than 5 with an amplitude greater than 10% of the amplitude of the primary frequency.

6. The actuator according to claim 4 further comprising an angular position sensor of the coil, delivering a signal to the electronic control circuit adapted to control a supply voltage of the coil according to a speed reference profile depending on a position.

7. The actuator according to claim 1 further comprising a mechanical shaft is coupled to a sensor magnet positioned in a vicinity of a magnet sensitive probe and interacts with the probe to detect a position of the sensor magnet.

8. The actuator according to claim 7 wherein the actuator is driven by a primary frequency periodic signal and in that it has, in magnetic interaction with the sensor magnet, a mechanical resonance frequency less than or equal to the primary frequency.

9. The actuator according to claim 1 further comprising a mechanical shaft supporting an element that has a reflective surface placed in a direct vicinity of the rotation axis.

10. The actuator according to claim 1 wherein the coil has a longitudinal elliptical non-circular section.

11. The actuator according to claim 1 wherein the coil has a longitudinal circular section.

12. The actuator according to claim 1 further comprising a mechanical shaft passing through the ferromagnetic inner core without contact or guidance with the ferromagnetic inner core.

13. The actuator according to claim 1 further comprising a mechanical shaft guided at the ferromagnetic inner core without contact or guidance with ferromagnetic yoke.

14. The actuator according to claim 1 wherein the ferromagnetic inner core and the outer yoke are made by stacking ferromagnetic sheets.

15. A method of controlling an actuator for an adaptive lighting system comprising a moving frame including an elliptical cylinder electrical coil, the method comprising: moving the electrical coil on an angular travel around a rotation axis A, the rotation axis A being orthogonal to a coiling axis B; placing the elliptical cylinder electrical coil in a magnetic field of a fixed magnet, the fixed magnet surrounding the elliptical cylinder electrical coil and including two semi-cylindrical portions, a first of the semi-cylindrical portions having a north pole directed toward the elliptical cylinder electrical coil, a second of the semi-cylindrical portions having a north pole directed away from the elliptical cylinder electrical coil, the actuator further comprising the ferromagnetic inner core inside the elliptical cylinder electrical coil and an outer ferromagnetic yoke surrounding the fixed magnet, said elliptical cylinder electrical coil disposed around the coiling axis and disposed in an annular air gap between the fixed magnet and the ferromagnetic inner core and fixedly coupled to an elongated shaft; moving the elliptical cylinder electrical coil in the air gap thereby rotating the elongated shaft relative to the semi-cylindrical portions and the inner core; and periodically modifying a value of a supply voltage of the coil according to a position signal from an angular position sensor of a spool and a speed profile according to a position.

16. The method according to claim 15 further comprising:
resin coating the coil;
the elongated shaft attached to the elliptical cylinder electrical coil and having ends extending beyond the elliptical cylinder electrical coil, the elongated shaft including a flat; and
the elliptical cylinder electrical coil being mechanically connected to the elongated shaft, and using the elongated shaft to evacuate heat produced by the elliptical cylinder electrical coil.

17. The method according to claim 15 further comprising:
Illuminating a motor vehicle light beam;
determining a position of the elongated shaft with a sensor;
adjusting current in the elliptical cylinder electrical coil based on determining the position; and
displacing a mirror connected to the shaft to move the light beam.

18. The method according to claim 15 wherein:
the elliptical cylinder electrical coil is free to be moved by magnetic torque created by electricity flow in the elliptical cylinder electrical coil;
the elliptical cylinder electrical coil being prevented from contacting with the inner core during rotation of the coil; and
an electronic control circuit supplying the coil with a signal that has a primary frequency of use greater than 100 Hz.

19. A rotary actuator comprising: a rotatable electrical coil having a substantially elliptical or substantially circular; an elongated shaft upon which the electrical coil is mounted, the shaft coupled to the electrical coil, said shaft defining a rotation axis in which the shaft and the electrical coil rotate; multiple semi-cylindrical permanent magnets; an outer ferromagnetic yoke surrounding and affixed to the semi-cylindrical magnets; a ferromagnetic inner core located inside of the semi-cylindrical magnets to form an annular air gap therebetween, said semi-cylindrical electrical coil disposed around a coiling axis orthogonal to the rotation axis, the shaft passing through the inner core; the electrical coil moving in the air gap between the semi-cylindrical magnets and the inner core; an electronic control circuit supplying the electrical coil with a signal that has a primary frequency of use greater than 100 Hz; and a beam emitted from a motor vehicle light source being movable by actuation of the actuator.

20. The actuator according to claim 19 further comprising:
a mirror coupled adjacent to a first end of the shaft;
a position sensor coupled adjacent to an opposite second end of the shaft;
the motor vehicle light source including a laser which creates the beam, the beam being reflected by the mirror toward a roadway; and
the actuator operably causing the beam to vary between intense and dim illumination characteristics.

21. The rotary actuator of claim 19 wherein the inner core extending past outer lateral faces of the semi-cylindrical magnets and the electrical coil in a lateral direction perpendicular to the rotation axis.

* * * * *